United States Patent [19]
Kim et al.

[11] Patent Number: 6,003,143
[45] Date of Patent: Dec. 14, 1999

[54] TOOL AND METHOD FOR DIAGNOSING AND CORRECTING ERRORS IN A COMPUTER PROGRAM

[75] Inventors: Thomas Dongsuk Kim, San Jose; Seth Gordon Hawthorne, Santa Cruz; Joseph Stanley Kosinski, Woodside, all of Calif.

[73] Assignee: Compaq Computer Corporation, Cupertino, Calif.

[21] Appl. No.: 08/807,347

[22] Filed: Feb. 28, 1997

Related U.S. Application Data

[63] Continuation of application No. 08/269,355, Jun. 30, 1994, abandoned.

[51] Int. Cl.[6] .................................................. G06F 11/00
[52] U.S. Cl. ................................................. 714/38; 706/46
[58] Field of Search ............................ 395/704, 183.14; 714/15, 16, 25, 34, 38, 39, 46, 47; 706/46

[56] References Cited

U.S. PATENT DOCUMENTS

| | | | |
|---|---|---|---|
| 4,595,981 | 6/1986 | Leung ........................................ | 371/19 |
| 5,124,989 | 6/1992 | Padawer et al. .......................... | 371/19 |
| 5,210,859 | 5/1993 | Aoshima et al. ......................... | 395/575 |
| 5,297,150 | 3/1994 | Clark ......................................... | 371/19 |
| 5,313,616 | 5/1994 | Cline et al. ............................... | 395/500 |
| 5,375,125 | 12/1994 | Oshima et al. ........................... | 371/19 |
| 5,410,648 | 4/1995 | Pazel ........................................ | 395/158 |

OTHER PUBLICATIONS

Casey, D. Doyle, "Computer Dictionary", 1994, pp. 75, 231–232, 371, 416.

Article by Colin Gerety, entitled "A New Generation of Software Development Tools" published by *Hewlett–Packard Journal*, Jun. 1980.

Article by Michael B. Davis, entitled "A Layout Algorithm for a Graph Browser" published by EECS Department University of California, Berkeley, May 9, 1985.

Article by Rowe, et al. entitled "A Browser for Directed Graphs" published by EECS Department, University of California, Berkeley Mar. 25, 1986.

Article by Sugiyama, et al. entitled "Methods for Visual Understanding of Hierarchical System Structures" published by *IEEE Transactions on Systems, Man, and Cybernetics*, vol. SMC–11, No. 2, Feb. 1981.

Microsoft Windows Benutzerhandbuch, 1992, pp. 78–79.

IBM Technical Disclosure Bulletin, vol. 36, No. 8, Aug. 1993, p. 331, "Graphical Monitoring of an Executing Application".

Proceedings on the Pacific Rim Conference on Communications, Competitors and Signal Processing, Victoria, Canada, Jun. 1989, IEEE pp. 265–268, "DPD: A Distributed Program Debugger for the REM Environment".

*Primary Examiner*—Robert W. Beausoliel, Jr.
*Assistant Examiner*—Nadeem Iqbal
*Attorney, Agent, or Firm*—Fenwick & West LLP

[57] ABSTRACT

In a computer system, an improved tool and method for debugging complex computer programs is disclosed. The tool extracts critical debugging information from computer memory and/or remote storage memory and uses this information to graphically depict call relationships among various functions comprising the program which is the subject of the debugging operation. Debug commands are accepted by the tool through a graphical user interface using operations performed by the user directly on the graphical representation of program functions. The ability of the tool to accept user commands through the graphical user interface and to display critical debugging information using this same interface greatly facilitates program debugging.

20 Claims, 11 Drawing Sheets

Microfiche Appendix Included
(9 Microfiche, 755 Pages)

TOOL AND METHOD FOR DIAGNOSING AND CORRECTING ERRORS IN A COMPUTER PROGRAM

This application is a continuation of application Ser. No. 08/269,355 filed Jun. 30, 1994, now abandoned.

This application includes appendices titled: Appendix A—microfiche copy of "Source Code for Reading Object Code Format and Graph Layout Algorithm having 324 fiche with a total of 4 frames; and Appendix B—microfiche copy of Source Code for a Computer Software Model of the Debugging System" having 431 fiche with a total of 5 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention

This invention relates to a system and method for locating and correcting errors in a computer program and, more particularly, to a system and method for graphically displaying the structure of a program and controlling the execution of the program during the software debugging process.

2. Description of Related Art

Newly created computer programs often include one or more inadvertent errors. Some software errors can result in the complete failure of a software system, while others may result in incorrect behavior. Although commercial software developers will typically devote 50–70% of their total development time to checking the computer program for errors and correcting those errors, it is almost inevitable that some errors ("bugs") remain even in production versions of the software released to the public. There is, therefore, a great need for an efficient and effective means for "debugging" software.

Debugging is the process of identifying and isolating a software error so that the problem can be corrected. Usually this involves examining the lines of code comprising the software program and/or observing the program's execution to determine the cause for the aberrant behavior.

In the prior art of debugging a program, a user may first read the program line-by-line to try to locate the error or errors. However, following the flow of a program by reading it line-by-line can be extremely difficult and time consuming, even in a relatively simple program. If the program contains many loops, subroutines, function calls, variables and the like, the user may not be able to trace the sequence of program execution, and hence may not be able to determine the effect of the execution of each line of the computer program.

"Debuggers" are software diagnostic tools that provide users with mechanisms for viewing and controlling the execution of programs (including the program states and the values of variables) for the purpose of helping the user identify errors in the program code. With prior art debuggers, the user can control the operation of the defective software program by inputting one or more debug commands and observing the results of the subsequent program execution. For example, a debugger command may be invoked to set a "break point" at a location in the defective program. The effect of a break point is to suspend program execution when the location of the break point is reached. The user can then cause the debugger to display the values of selected variables. State-of-the-art debuggers can also display several lines of disassembled machine code and/or the corresponding lines of source code occurring before and after the break point. Even state-of-the-art debuggers, however, do not predict where and whether a program will branch. Therefore, a deficiency in current state-of-the-art debuggers is that the lines of code which they display following the point of suspension are simply the next consecutively numbered lines of code in the program. Such lines of code may not necessarily be the code which will be executed when the user resumes operation of the program.

Typical debug commands include: a "step command," in which the program is executed one line at a time, with the lines of code possibly being displayed as they are executed; a "watch value command," which displays the changing value of a selected variable while the program is running; a "trace command," which displays a list of active functions on the stack; a "data break command," which stops execution of the program upon the occurrence of a user-selected condition, such as a variable achieving a predetermined value; and an "assign command," which assigns a user-selected value to a variable.

Notwithstanding the wide-spread use of debuggers, debugging can still be difficult and time consuming. One reason for this is that prior art debuggers are text-based, i.e., the debuggers provide the user with information in the form of a series of lines of text and accept commands in a similar format. For example, with prior art debuggers the user may type in an instruction which causes the debugger to place a break point in a particular line of a program or, using a mouse, "point and click" on a line of code to place a break point at the beginning of that line. Upon the occurrence of the break point, prior art debuggers can display lines of text containing the disassembled machine code executed up to the break point, the corresponding line or lines of source code and the value of certain selected variables.

The operation of a debugger at this text-based level has numerous disadvantages. For example, the user must be intimately familiar with the organization of the program being debugged, since the debugger can only display the lines of code comprising the execution path actually traversed by the program; the debugger cannot tell the user which alternative execution paths could have been taken by the program using a different set of input data. Prior art debuggers also do not tell the user which functions could be called by the particular function located at the break point. The user must deduce this information by examining the displayed code. Thus, to fully appreciate the state of the program at the break point, the user must figure out and retain a complex mental picture of the various execution paths which the program might have taken to have reached its current state and the various execution paths it might take once the next debug command causes program execution to resume.

Users of prior art debuggers frequently find themselves in a situation somewhat analogous to a cross-country traveller without a road map who, upon reaching each successive intersection, must ask for the name of the closest town in each direction. Without a road map showing all the roads that lie between the embarkation point and his or her destination, the traveller cannot plan the most efficient way to get to the ultimate destination. Instead, using only trial and error, the traveller can easily get lost, may have to backtrack and will frequently find himself or herself going down dead end streets.

Despite many advances in debugging technology, creating defect-free software is an elusive goal that is far from being achieved. In fact, the trend toward increasingly complex software systems makes achieving this goal even more difficult. Thus, the debugger is one of the most important tools affecting a programmer's productivity. It is surprising therefore, that despite the considerable effort which the software industry has devoted to debuggers, their use is still so cumbersome. (The inventors believe that this results from the fact that prior art debuggers are based upon a model that was developed to support traditional character-based terminals.)

In view of the above, it is clear that there exists a need for an improved debugging tool. In particular, there exists a need for a debugging tool that can abstract critical debugging information from increasingly complex software, display that information in a dynamic and useful graphical format and, in addition, allow the user to control program execution through operations performed directly on the graphical representation of the program.

SUMMARY OF THE INVENTION

The present invention provides an improved debugger having a graphical user interface. The debugger preferably operates in a client-server computing environment.

A portion of the debugger, hereinafter referred to as the "debugger server," preferably executes on the same server computer as the program which is to be debugged. The debugger server receives debug commands transmitted from the client computer and, in cooperation with the server's operating system, executes these commands. The debugger reads certain information, called "symbolic information," which is typically stored in the server computer's memory or on an associated magnetic disk storage subsystem. The debugger server also reads program state information from that computer's memory. Using the symbolic information, the debugger server derives the "call relationships" between the functions contained within the program, i.e., which functions can call which other functions. The server computer then transmits this information, along with the current program state, to the client computer.

A graphical user interface portion of the debugger is preferably resident on the client computer. This portion of the debugger receives the call relationship information and program state information transmitted from the server. Using this information, the user interface constructs and displays a graph of the functions comprising the program which is to be debugged. For example, the debugger could display a tree-like graphical representation of the program, wherein each function comprising the program is represented by a node on the graph and the call relationships between functions are illustrated by lines interconnecting the nodes. Such a graph is known as a "call tree".

The interface of the present invention displays the call tree in several user selected formats. This tree serves as a "road map" for debugging, allowing the user to easily determine the set of possible execution paths that the program may take in the future. The interface also annotates the call tree with additional information, such as the values of user-selected variables, highlighting the current execution path as determined from the function call stack, and indicating, in any convenient way, when a break point is set in a function. The interface also provides debugging commands that can be applied to the functions represented by call tree nodes. These commands include the ability to step program execution a function at a time, the ability to view the source code associated with a function, the ability to set a break point on a function, and the ability to "expand" and "collapse" call tree nodes, as will be discussed later in greater detail. The interface transmits these commands to the server computer for execution.

The user may enter debug commands into the client computer in the traditional manner by typing commands on an associated keyboard. Alternatively, however, and in accordance with an important aspect of the present invention, the user may control the functioning of the debugger and enter debug commands directly through the graphical interface simply by using a mouse to point and click, first directly on the node shown on the displayed call tree whereat the command is to be executed and then on a graphical symbol, such as an icon or menu item, for the desired debug command.

The ability of the present invention to graphically represent debugging information and accept debug commands through a graphical interface greatly facilitates the software debugging process. In particular, the ability of the debugger of the present invention to display a call graph with indications along the call graph showing the last function executed, all prior functions executed and all functions which could be called from the point where program execution is suspended greatly enhances the user's ability to more thoroughly and easily understand the current state of the program.

In relation to the analogy of the cross-country traveler described previously, the present invention is equivalent to providing the traveler with a complete road map of all highways and surface streets between the embarkation point and the ultimate destination. Such a road map allows the traveler to assess the best possible means to reach a particular destination. By analogy, the present invention provides the same type of road map to the programmer and allows him or her to assess the best and most efficient means to debug a program.

These and other advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

Figure 1:
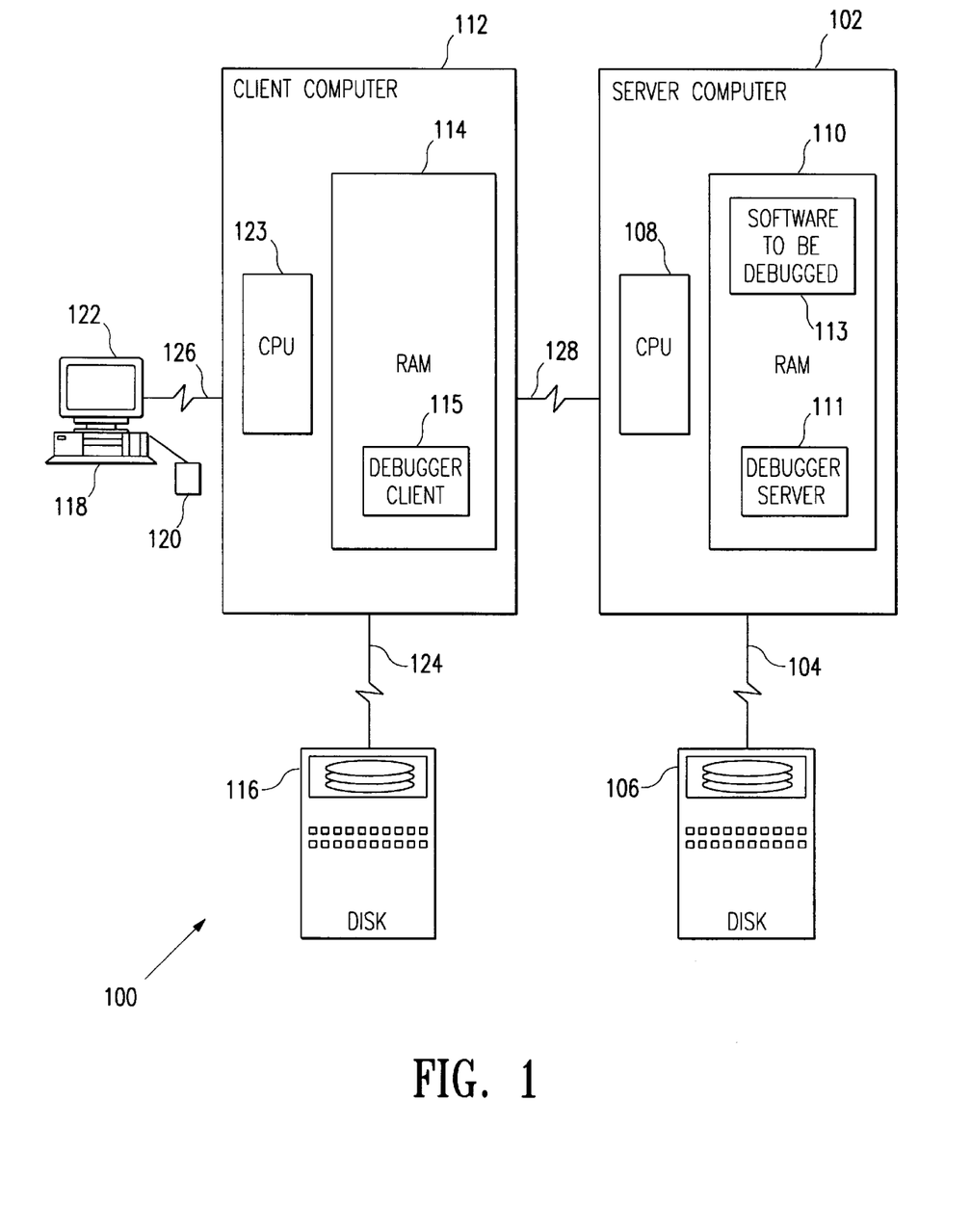
FIG. 1 is a block diagram of a client/server computing system for carrying out a preferred embodiment of the present invention.
Figure 2:
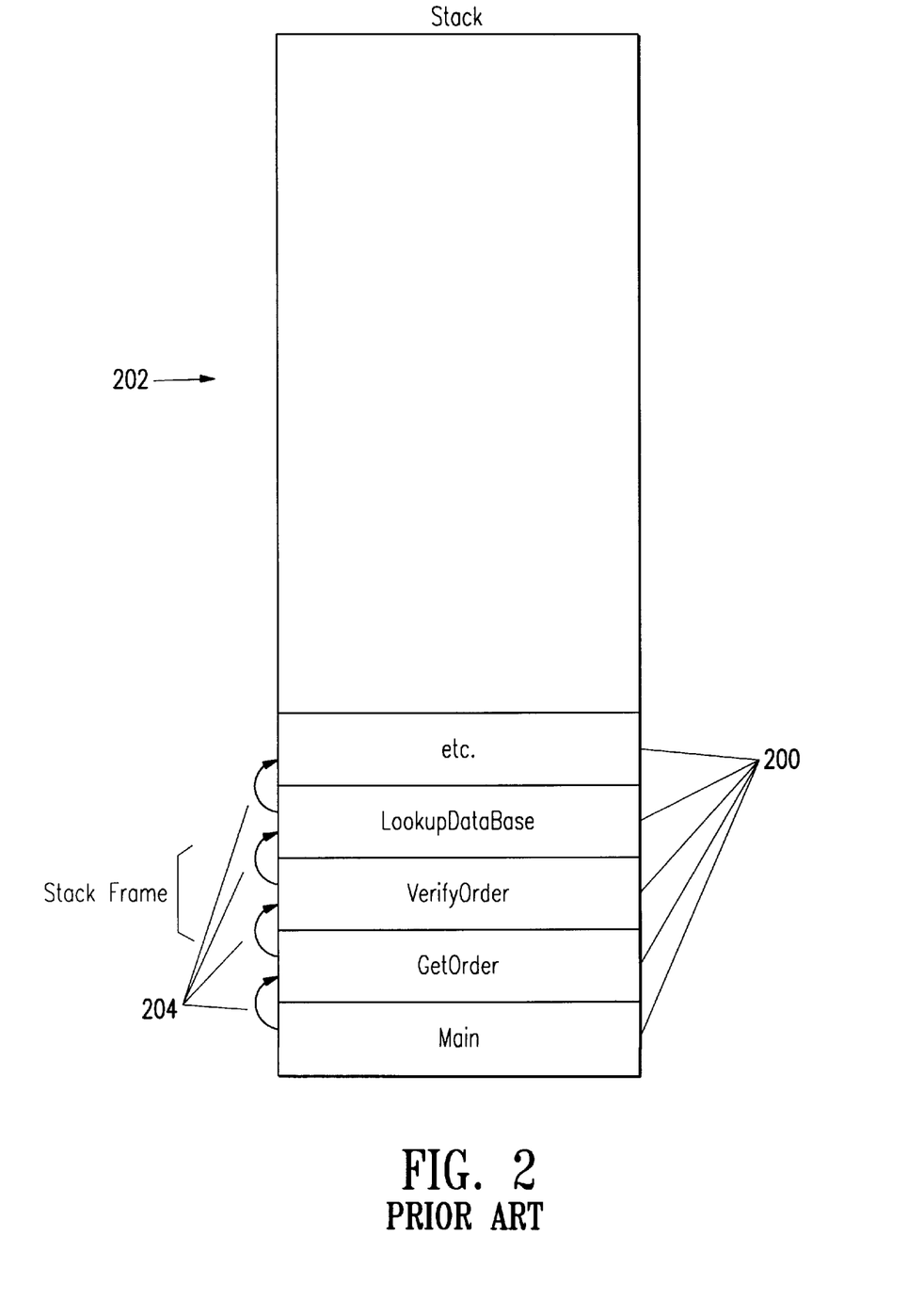
FIG. 2 illustrates memory organization of the stack within the server computer.

As illustrated in FIG. 1, the debugger of the present invention is preferably designed for use in a client/server computing environment 100. The server computer 102 communicates over a bus or I/O channel 104 with an associated disk storage subsystem 106. The server computer 102 includes a CPU 108 and RAM 110 for storing current state information about program execution. A portion of the RAM 110 is dedicated to storing the register states and local variables associated with each function of the program which is currently executing on the server computer 102. This portion of RAM 110 is typically called a "program stack" or simply "the stack" 202 (FIG. 2). As illustrated in FIG. 2, the RAM locations, associated with information pertaining to each such function, are organized in a data structure 200 known as a "frame".

The client computer 112 (FIG. 1) similarly includes RAM 114, associated disk memory 116, and a keyboard 118, a mouse 120 and a video display terminal ("VDT") 122. The client CPU 123 communicates over a bus or I/O channel 124 with the disk storage subsystem 116 and via I/O channel 126 with the keyboard 118, VDT 122 and mouse 120.

Consistent with the preferred client/server model, respective portions 111/115 of the debugger software 115/111 are preferably designed to operate simultaneously on the client 112 and server 102 computers. Coordination between the operations performed by the two portions of the debugger software are maintained by communication over a network 128.

As will be discussed in greater detail below, most software programs 113 today are written in so-called third generation "high-level" languages which a compiler translates to machine instructions. Programs written in third generation languages are organized into functions (also referred to as procedures or routines). Functions are defined to perform specific processing tasks. They are composed of one or more lines of source code and may have their own local variables which maintain state information that is unique to the function. Functions may call other functions to perform specific tasks. When this occurs, execution transfers to the "called" function and will return to the "calling" function when the called function has completed the requested task.

The execution state of the program is maintained on a "call stack," located within computer memory, which records the current execution location in each function that has been called. When a function is called, the current execution location in the calling function is recorded in the stack. When the called function completes, this location is removed from the stack and execution resumes at the saved location in the calling function.

As is known in the programming art, program execution begins at the "Main" routine and progresses as the Main routine calls other routines to perform various processing tasks. These other called routines may in turn call yet additional routines. The execution state of a program at any particular time is represented by the program call stack.

Figure 3:
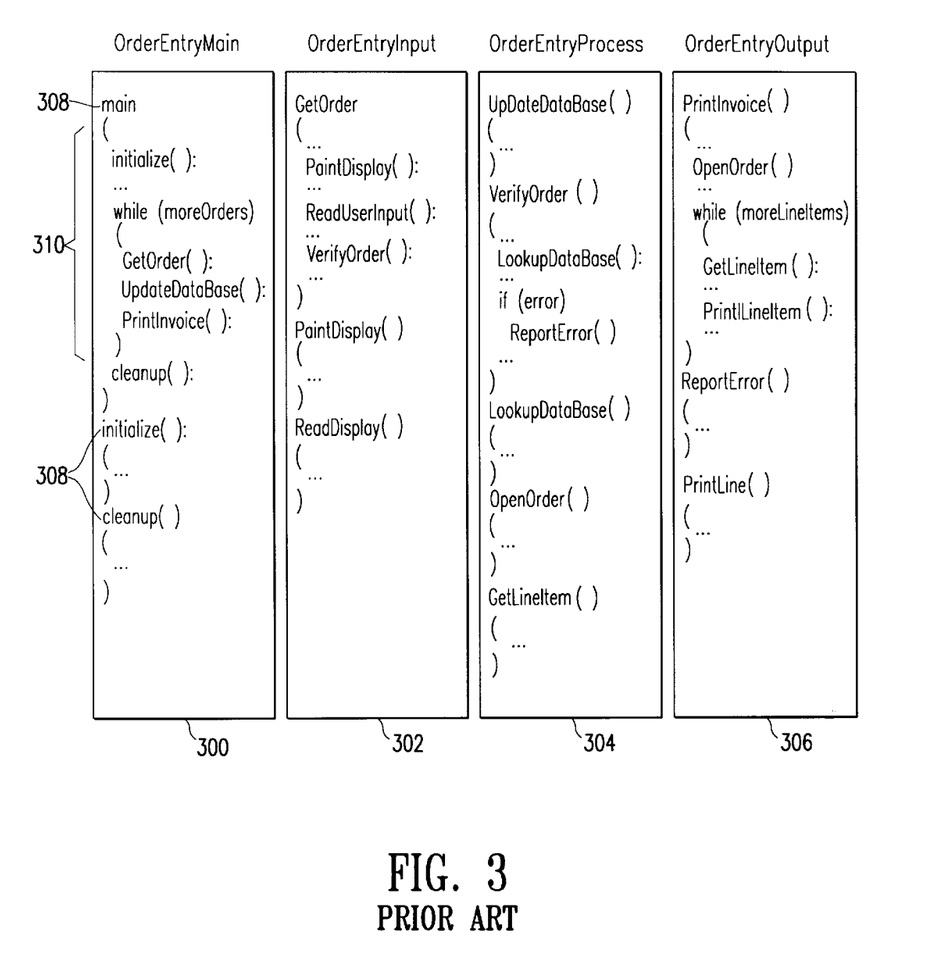
FIG. 3 is a diagram illustrating the file organization of a complex computer program.

As illustrated in FIG. 3, a typical program to be debugged, for example, an order processing program, may be composed of several source code files: (a) Main 300; (b) Input 302; (c) Processing 304; and (d) Output 306. Each source code file 300, 302, 304, 306 is composed of several functions 308. Each function 308 typically consists of plural lines of source code 310 and, upon completing its task or upon the occurrence of a particular event, each function will either initiate (or "call") the operation of another function 308, or return execution to the function 308 which called it.

Before the order processing program can be run on the computer 102, its source code files 300, 302, 304, 306 must be "compiled". Compilation converts the human-readable source code 310 into a binary code, called "object code". Many commercially available compilers may be used in connection with the present invention. For example, a Tandem C compiler from Tandem Computers Incorporated of Cupertino, Calif. may be used. This compiler generates object files in Common Object File Format ("COFF"). Many UNIX compilers also generate COFF files. The use of any particular compiler is not important to the present invention, as long as the compiler produces the necessary information for use by the debugger of the present invention, as described herein.

Figure 4:
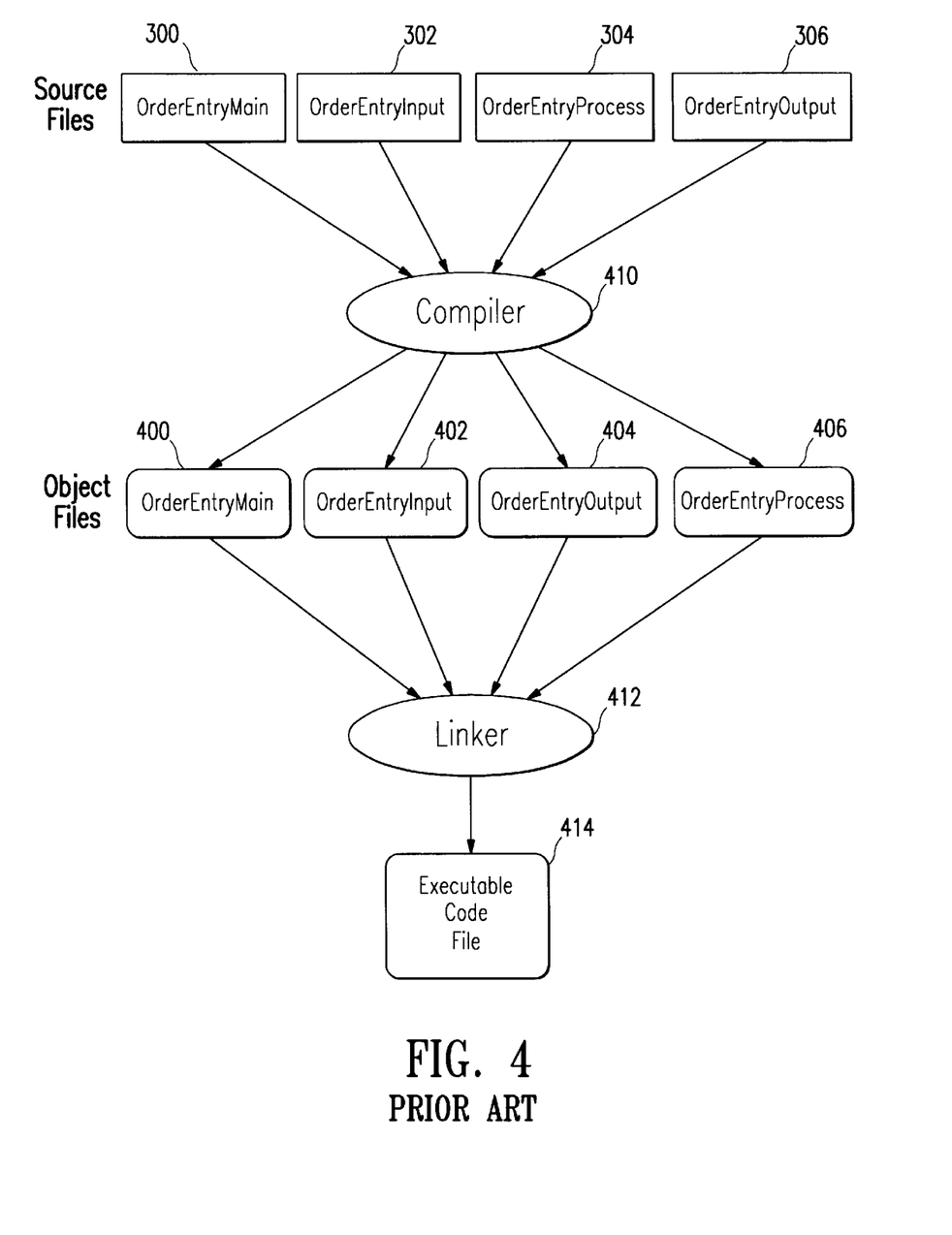
FIG. 4 is a flow diagram illustrating the conversion of source code into executable code.

As illustrated in FIG. 4, the compiler 410 converts each source code file 300, 302, 304, 306 into an object code file 400, 402, 404, 406. In addition to translating the source code into binary computer instructions, the user can also instruct the compiler 410 to include a significant amount of additional information, called "symbolic information," in each object code file 400, 402, 404, 406. The symbolic information includes, for example, variable names, function names, variable addresses and lists of all locations within the object code file where one function calls another function. Of particular interest, with respect to the operation of the present invention, is that portion of the symbolic information from which the debugger can determine the hierarchial call relationships between the various functions 308, i.e., which functions 308 can call which other functions 308. The symbolic information typically forms a portion of each object file 400, 402, 404, 406 stored in the computer's memory 110. Alternatively, however, the symbolic information may be stored in a separate file located in the disk storage subsystem 106. As will be explained below, the primary use for the symbolic information is in debugging the executable program.

Figure 5:
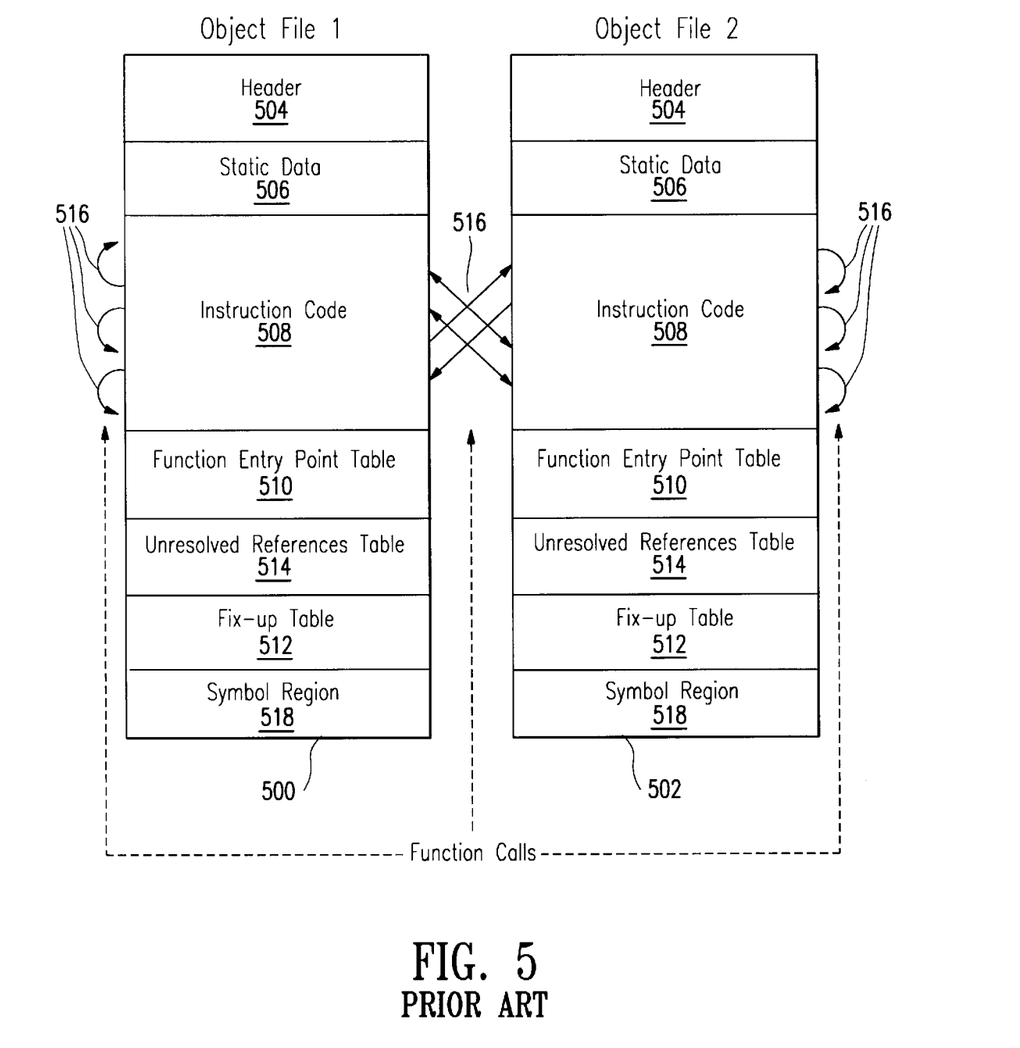
FIG. 5 is a diagram illustrating the structure of the information files created by the compiler for the program to be debugged.

FIG. 5 illustrates the structure of two typical object code files 500, 502. The Header section 504 of each file contains pointers to the starting locations of the various sections of the file, for example, the Header section contains the file offset for the Fix-up Table. The Static Data section 506 of each file contains all of the constant values used by the program. The Instruction Code section 508 of each file contains the actual binary coded instructions for executing the program. The Function Entry Point Table 510 of each file contains a list of functions which reside in the associated file and the addresses of each such function. The Fix-up Tables 512 are lists of addresses within each associated file where external functions are referenced. Each Unresolved External References Table 514 contains a list of all functions 308 which are referenced within that file but are defined elsewhere.

All of the object code files are ultimately provided to a "linker" 412 (FIG. 4). The linker 412 is a software program which combines or "links" the various object files 400, 402, 404, 406 into a program 414 that can be executed by the computer 102. An important function of the linker 412 is to read the Function Entry Point Table 510, the Fix-up Table 512 and the Unresolved References Table 514 of each object code file 400, 402, 404, 406. The information collectively contained in these three tables is sufficient to enable the linker 412 to produce an executable code file 414 having the same data structure illustrated in FIG. 5 and all necessary references or logical connections 516 (FIG. 5) between the various functions originally residing in all of the object code files 400, 402, 404, 406 comprising the program.

Although the use of a compiler which generates object code files using the COFF standard is not required by the present invention, if such a compiler is used, then the Tandem Computers Incorporated Native Linker/Loader could be used to link the object code files. Alternatively, any linker that can process other object file formats could be used. Again, the use of any particular linker or any particular file format is not important to the present invention as long as the information necessary to the operation of the present inventive debugger, as set forth herein, is provided.

During execution of the program, the server computer 102 maintains information in its memory 110, called "state information." As implied by the name, the state information is all information needed to reconstruct the current state of the CPU 108. The state information includes the stack 202 (FIG. 2). In the usual case, this information is maintained as a list 204 of frames 200 within main memory 110. As is known in the art, a stack pointer identifies the function within the list currently being executed by the computer 102.

The debugger server reads the symbolic information stored within the server computer's memory 110 or on disk 106. As will be apparent from the foregoing discussion, by reading the Function Entry Point tables 510, as supplemented by the linker 412 for references 516 to functions in other object code files and the Fix-up tables 512, the debugger can obtain all the information necessary to create a complete call graph for the example order processing application program (or any other program being debugged). Alternatively, in the particular instance where the debugger is operating on COFF files, where the COFF standard does not include a Fix-up Table, then the debugger is simply programmed to synthesize Fix-up Table information by searching the machine instruction code for all addresses where one function calls another.

Figure 6:
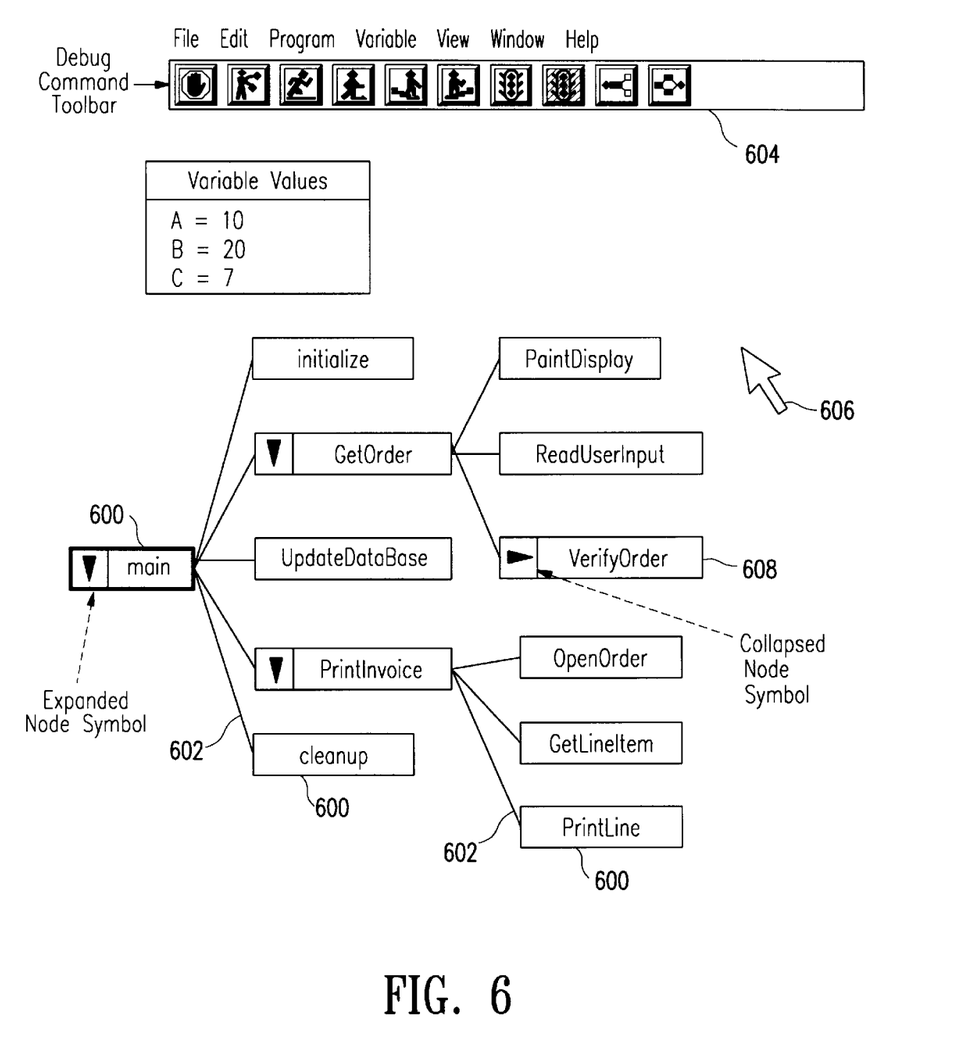
FIG. 6 is a dynamic call tree created and displayed by the debugger of the present invention illustrating the possible execution paths of an order processing program prior to debugging.

FIG. 6 illustrates such a call graph for the example order processing program. Each of the twelve nodes 600 in the figure represents a particular function included within the overall program. The lines 602 connecting the nodes 600 indicate that the left-most function may call the function to the right. For example, as set forth in this figure, the main program function can initiate calls to functions (nodes) which get the order, update the database, print an invoice, etc. Each such function 600, in turn, calls subsidiary functions which carry out the physical steps of painting a visual display on the computer terminal reading user input, etc.

The debugger server also reads the stack information from the target program's address space in the memory 110 of the server computer 102 and determines the state of the stack 202. As will be understood by those skilled in the art based upon the forgoing discussion, typically, a computer has a dedicated stack pointer register or uses a general purpose register as a stack pointer. The debugger of the present invention uses the stack pointer to find the first stack frame 200. Since all stack frames are linked 204, the debugger can then easily locate the remaining frames. After having read the symbolic information, derived the information necessary to create a call graph as explained above and obtained the stack information, the server then transmits the call graph and stack information to the client computer 112.

The preferred embodiment of the present invention includes graphical interface software resident on the client computer 112. The graphical interface software displays debugging information on the VDT 122 and receives debug commands from the user, either via the keyboard 118 or by input from a mouse 120 operating a moveable curser or pointer 606 (FIG. 6) on the VDT 118 in a known fashion.

The graphical interface software preferably includes as a portion thereof an off-the-shelf graphics software package, such as, for example, Microsoft Windows, available from Microsoft Corporation of Redmond, Wash. or zApp Application Framework, available from Inmark Development Corporation of Mountain View, Calif. Similar commercially available graphics software packages, capable of creating graphical drawings and performing user interactions as described herein, may also be used.

Using established algorithms such as, for example, the "Sugiyama Algorithm", disclosed in "Methods for Visual Understanding of Hierarchial Systems Structures", by Kozo Sugiyama, Shojiro Tagawa and Mitsuhiko Toda in *IEEE Transactions On Systems, Man and Cybernetics*, Vol. SMC-11, No. 2, February, 1981, pgs. 109–125; Thesis: Michael B. Davis, "A Layout Algorithm for A Graph Browser", *U.C. Berkeley Engineering Library;* or "A Browser for Directed Graphs", by Lawrence W. Rowe, Michael Davis, Ely Messenger, Carl Meyer, Charles Spirakis and Alan Tuan, *U.C. Berkeley Engineering Library*, and the call graph information transmitted from the server, the client constructs a visual rendering of the call graph on the VDT 122. Using the stack information transmitted from the server, the client connects the nodes and highlights the current path.

Each of the above-identified references is incorporated herein by reference as non-essential subject matter; other known graphing algorithms may be substituted into the debugger of the present invention in place of the Sugiyama algorithm or the Davis modification of that algorithm.

Figure 7A:
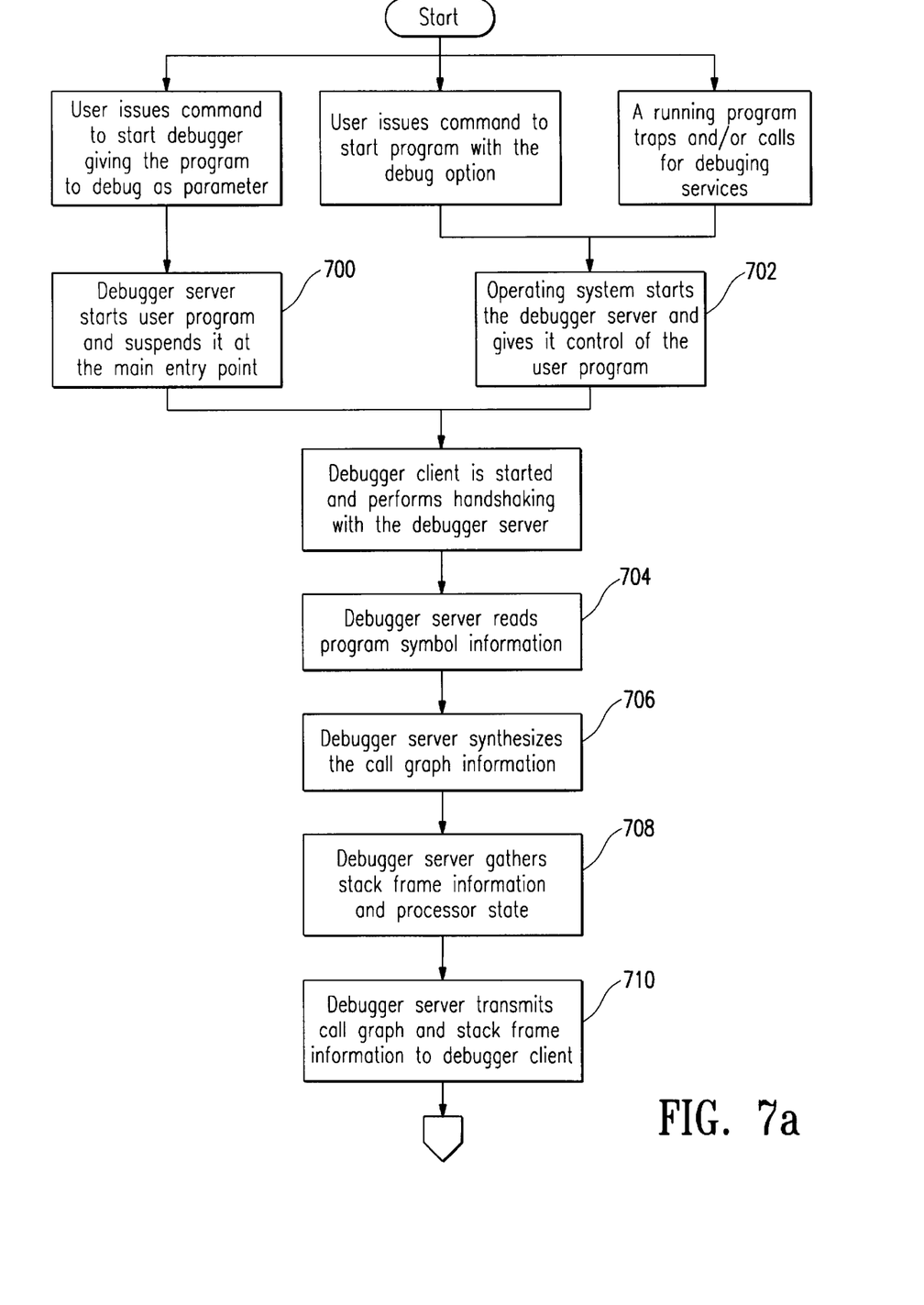
FIGS. 7a and 7b are flow diagrams in accordance with a preferred embodiment of the present invention.
Figure 7B:
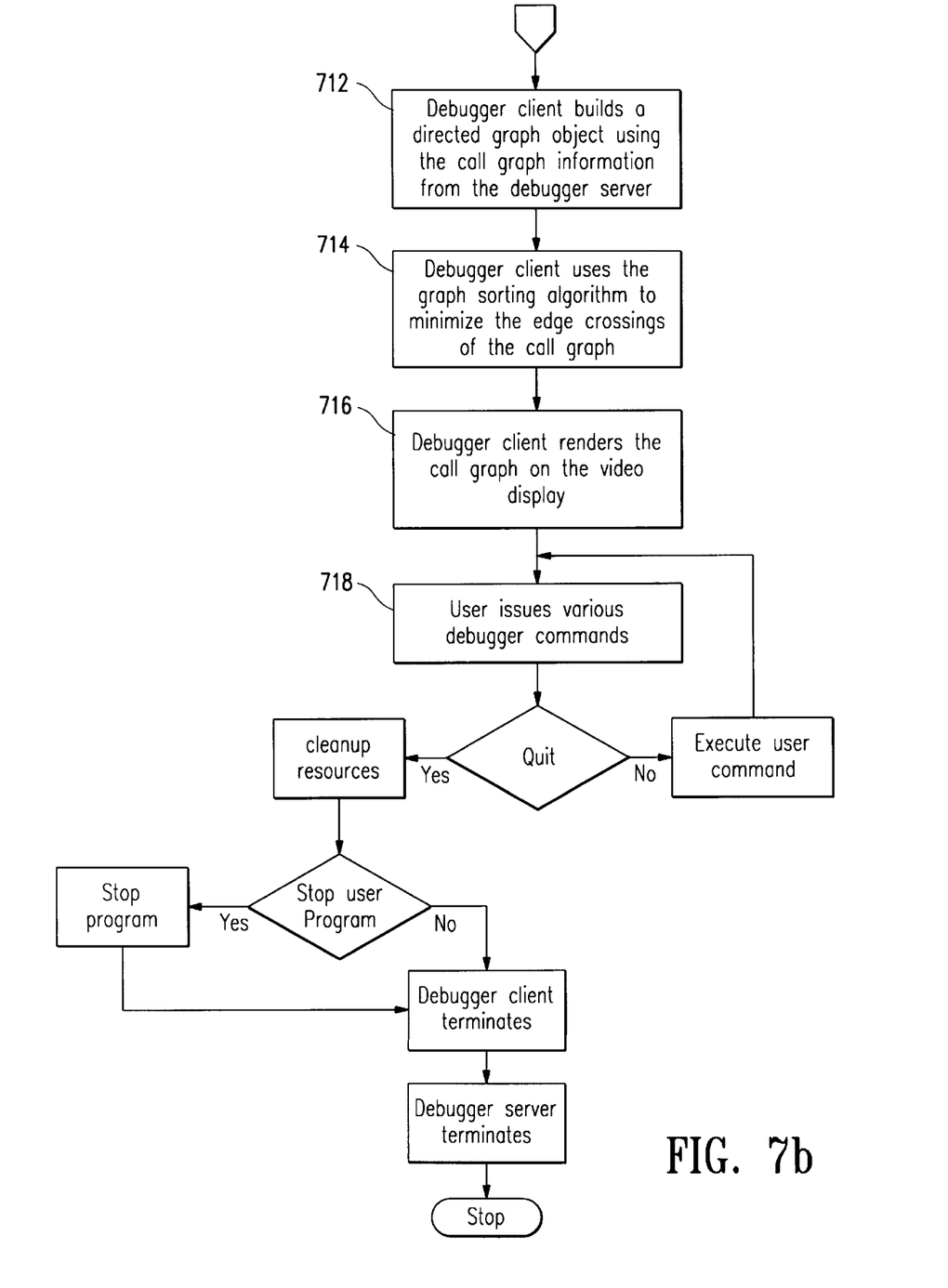

The debugger operates according to the process steps illustrated in FIGS. 7a and 7b. As seen in these figures, the program to be debugged can be started under the control of the debugger program 700 or by the operating system which subsequently calls the debugger 702. In either event, the application program is loaded into the server computer's memory 110 and comes under control of the debugger server. The debugger then reads the symbolic information 704 from the server computer's memory 110 or associated disk subsystem 106, derives the call graph relationships among the various functions 706 and reads the frame information and pointer information from the server memory 708. The server then transmits this information over the network 128 to the debugger client 710.

Based upon the information transmitted from the server to the client, the graphical interface software residing on the client computer 112, using the Davis enhancement to the Sugiyama algorithm, constructs 712, 714 and displays 716 a call graph of the program being debugged. Since the frame stack information is also transmitted to the client, the debugger determines and highlights the current cull path of the program on the call graph. FIG. 6 illustrates the call graph rendered before the debugger initiates program execution. Note that, in this figure, only "MAIN" is highlighted, thereby indicating that the program is ready to execute.

Utilizing the mouse 120, the user inputs a debug command 718. For example, the graphical interface software could be designed to accept commands using the "point and drag" and/or "point and click" methods. According to the point and drag method, a plurality of symbols representing the various debug commands, for example, as shown in FIG. 6 at 604, may be displayed across the top of the VDT screen 122 as a Debug Command Toolbar. The user selects an object and a command to operate on that object by manipulating the mouse 120 to move a curser or pointer 606 displayed on the VDT screen 122 until it points to the location on the call graph where the debug command is to be executed. The user then presses the button on the mouse, moves the mouse 120 until the pointer 606 points to the location on the command tool bar 604 displaying the icon for the desired debug command and releases the button. The "point and click" method is similar, except that the button on the mouse 120 is pressed and released while the pointer 606 is pointing to the location on the call graph where the command is to be executed. The pointer 606 is then moved to the location along the toolbar 604 where the desired debug command icon is located and the button on the mouse 120 is pressed and released a second time. Both methods for inputting commands to general purpose computers are well known in the art.

Figure 8:
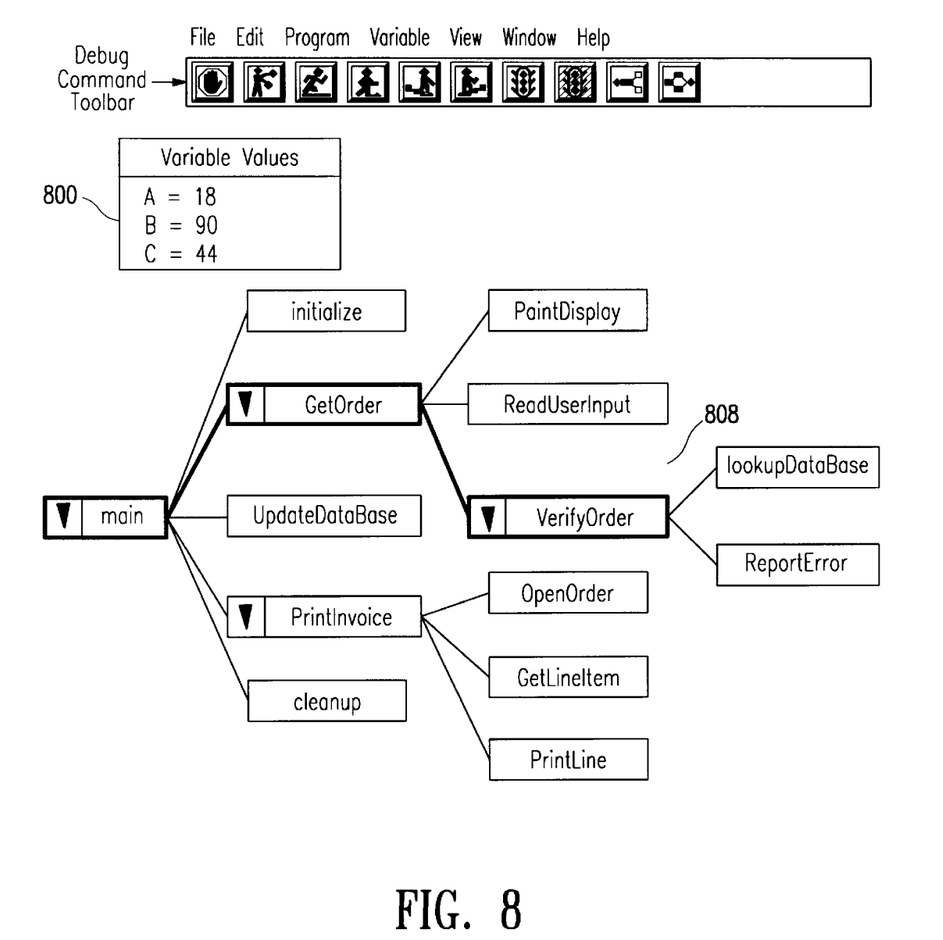
FIG. 8 is a dynamic call tree created and displayed by the debugger of the present invention illustrating the state of the example order processing program in which the function "Main" has called the function "Get Order" which subsequently called the function "Verify Order," and wherein the "Verify Order" node has been expanded to show its child nodes (functions) when compared to FIG. 6.

In either event, the client then transmits the debug command to the debugger server, thereby causing the order processing program to execute in accordance with that command and under control of the debugger. For example, with reference to FIG. 8, if the debug command was the entry of a break point at Verify Order 808, the program would execute up to that breakpoint. Upon reaching the breakpoint, the server portion of the debugger reads the frame information andtransmits the current state of the program to the client. Upon receipt of this information, the client alters the display by highlighting the execution path followed by the program up to the break point at the Verify Order function 808. FIG. 8 illustrates the graphical user interface display at such an intermediate step in the debugging process. Note that, by highlighting the execution path on the displayed call graph, the invention provides the user with an easily understood graphical display showing, not only the alternative paths the program could travel when the program is allowed to continue running, but also the execution path already traveled by the program. As previously mentioned, the values of selected variables 800 at the time the break point is encountered may also be displayed.

If the user locates the bug based upon the displayed information, the user then corrects the error in the source program, recompiles, re-links and restarts the program. Alternatively, if the bug is not located, then the user inputs another debug command. This process continues and successive states of the program are illustrated on the graphical display (along with selected variables, source code and disassembled machine code, as desired) until all bugs are located, corrected and the program performs in the proper manner.

In the course of a debugging session, a programmer will want to concentrate his or her efforts in a particular area of the program. The present invention allows the programmer to hide or show necessary program detail by allowing intermediate nodes of the call tree to be "collapsed" (as illustrated in FIG. 6) or "expanded" (as illustrated in FIG. 8). To allow for such a control, each node which has child nodes is provided with an icon button which functions as a switch. When a node is collapsed, the child function nodes will not be displayed; when expanded, the child function nodes are displayed. By allowing the programmer to control the level of detail displayed, the debugger is providing the capability to control the visual complexity that the user has to deal with.

Figure 9:
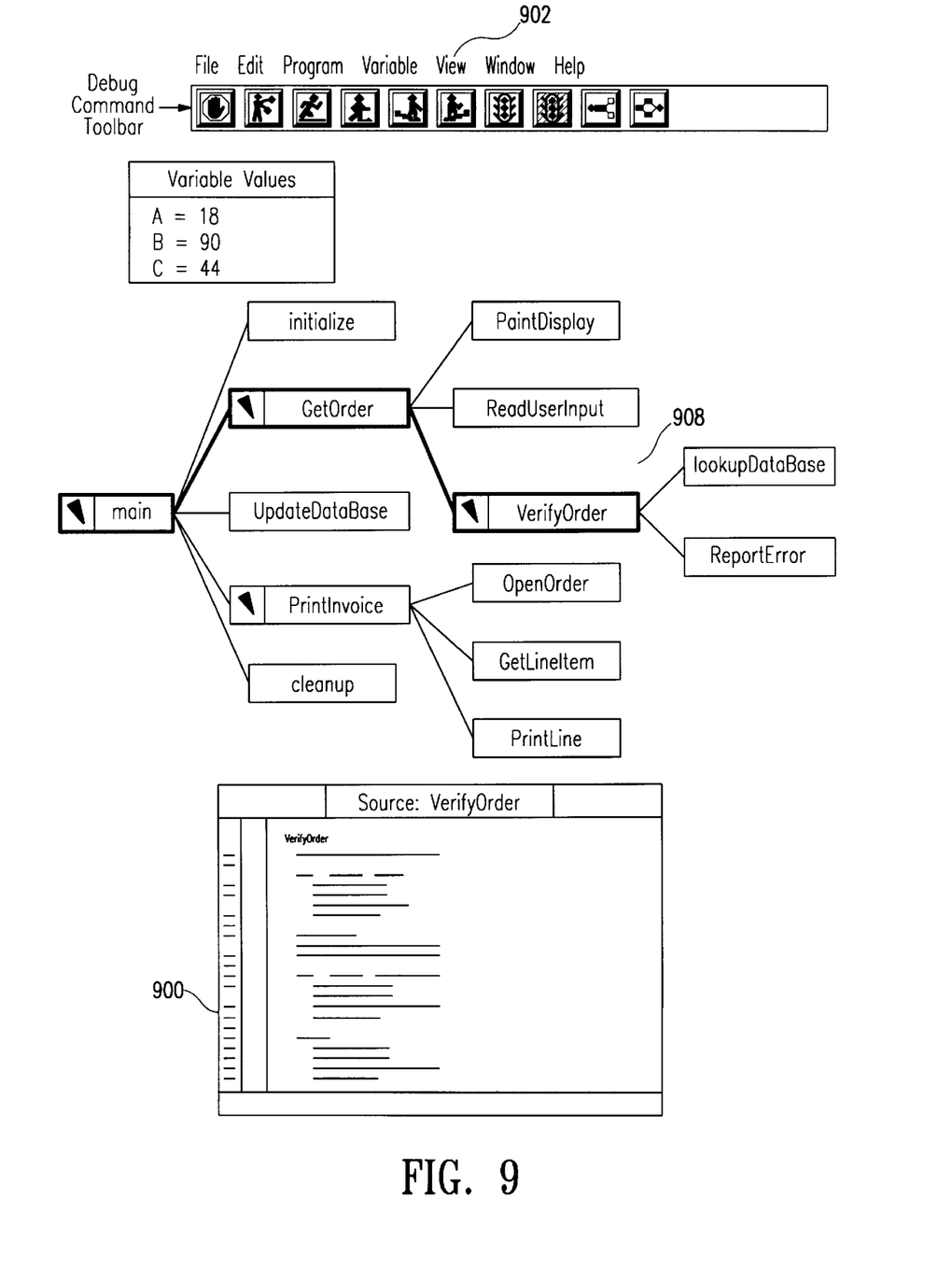
FIG. 9 is a dynamic call tree created and displayed by the debugger of the present invention illustrating the same program state as FIG. 8, but in addition, this figure shows that the Verify Order node was selected and the user issued a command to display the source code comprising the Verify Order function.

FIG. 9 illustrates a display window 900 wherein the source code corresponding to the Verify Order function 908 is displayed. Disassembled machine code (not shown) could be displayed in addition or as an alternative. The source code display 900 (or, alternatively, a disassembled machine code display) may be obtained by issuing commands using the same "point and click" or "point and drag" techniques discussed above. In the particular case illustrated to FIG. 9, the user first points and clicks on the Verify Order node 908 and then on the Source Code View menu item located under the view menu 902 along the debug command tool bar. Thus, it is apparent from the foregoing description that the present invention provides an extremely simple way to locate and display lines of code associated with a function and/or to issue a debug command, such as a breakpoint, at a function, rather than having to browse the source code in search of the first line of the target function.

Figure 10:
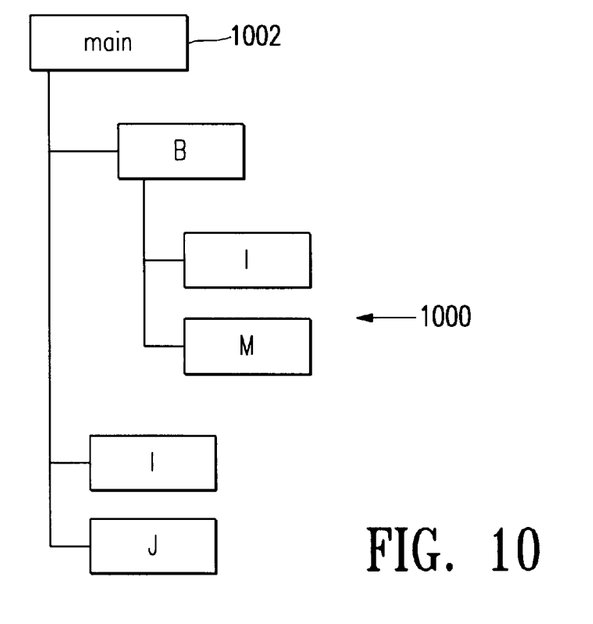
FIG. 10 is an "acyclic" call tree display of a program's organization generated by the debugger of the present invention.

In the call graph view, the debugger of the present invention has the capability to display the call graph in two modes which we call the "acyclic" (FIG. 10) and "cyclic" (FIG. 11) modes. A cycle is present in a call graph when there is recursive function call. A recursive call exists when a function calls itself or another function that is active on the program stack 202. In essence we have a loop. The two modes, cyclic and acyclic, have different advantages. FIG. 10 illustrates the general case of an acyclic representation of a call graph 1000 which is rendered on the VDT screen in a top-down fashion, in which the program's top-most function (main) 1002 is at the very top and subsequent child functions are indented to the right and spaced lower in the window. The advantage of the acyclic representation is that it is visually clear because there are no lines which cross each other since the debugger replicates the function node in all the places that it is referenced. For example, if function MAIN calls functions B, I and J, and B calls functions I and M, I will be represented twice in the acyclic view. A possible disadvantage of this representation under certain circumstances is that one loses the information about how many functions call a particular function. In the example of FIG. 10, it is simple to see that I gets called by MAIN and B, but it would be difficult to visually extract this information from a more complex call graph.

Figure 11:
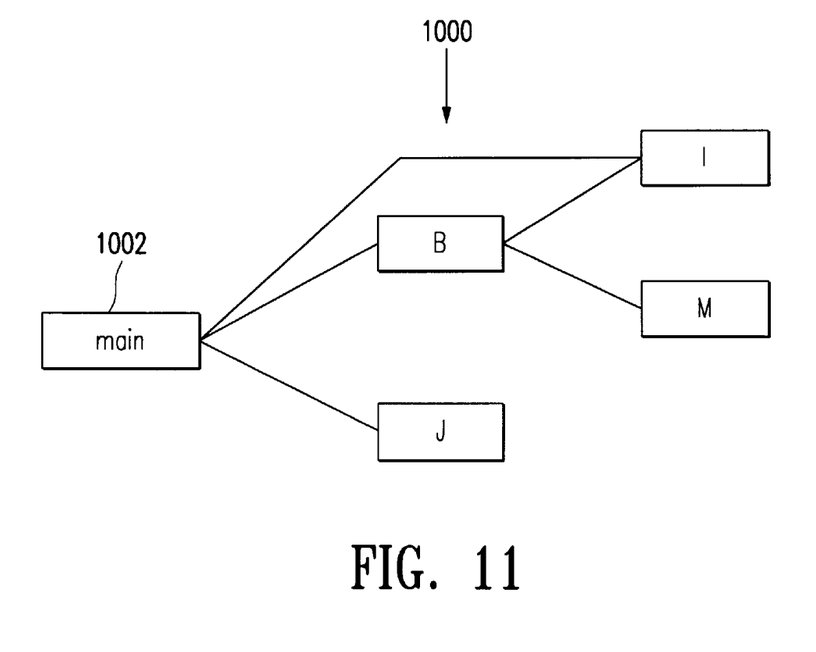
FIG. 11 is a "cyclic" call tree display of the organization of the same program as illustrated in FIG. 10.

FIG. 11 is a cyclic representation of the same call graph 1000 as is shown in FIG. 10. Here, there is no attempt at replication of nodes, but the rendering of program structure is more complex. To display a cyclical representation of the call graph, the graph is laid out in a left-to-right fashion where the MAIN function 1002 is at the very left and expansion through the child nodes occurs to the right. Since there is only one instance of each function node, the debugger must show all connections going into and out of a single representation of the particular node.

For large programs with many recursive calls, the cyclical representation of the call graph may get very complex. This is the reason that the present invention offers the user an option to use either mode so that the user can view the representation that provides the necessary information in the most understandable format.

As can be seen from the above detailed description, the present invention greatly simplifies debugging. It is particularly useful in the debugging of complex programs because the graphical nature of the display shows the user the organization of the program in a way which prior art text-based debuggers cannot. With the present invention, the entire call graph of the program (or a selected portion of the call graph) may be displayed, thereby providing the user, in a single display, with: (a) information relating to the overall program organization; (b) the current state of execution of the program; (c) the execution path taken by the program to reach its current state; (d) alternative execution paths the program might have taken; and (e) alternative execution paths the program could take when the program is allowed to continue execution. Clearly, existing text-based debuggers cannot provide such information to the user in a single, dynamic display. These five pieces of information, displayed on a single screen in a simple graphical format, combined with the ability to enter debug commands by acting directly on the graphical rendering of the program, greatly facilitates the debugging process.

Several preferred embodiments of the present invention have been described. Nevertheless, it will be understood that various modifications may be made without departing from the spirit and scope of the invention. For example, debuggers according to the present invention can be run on a single computer, rather than in the preferred client-server environment. While execution paths may preferably be displayed in bold or highlighted video along a call graph, wherein program functions are represented as nodes and lines connecting the nodes depict the ability of one function to call another function, numerous other ways of graphically conveying program organization and execution path information will be apparent to those of ordinary skill in the art based upon the present disclosure. Thus, the present invention is not limited to the preferred embodiments described herein, but may be altered in a variety of ways which will be apparent to persons skilled in the art.

In describing the preferred embodiments, a number of specific technologies used to implement the embodiments of various aspects of the invention were identified and related to more general terms in which the invention was described. However, it should be understood that such specificity is not intended to limit the scope of the claimed invention.

LIST OF APPENDICES

Appendix A—Microfiche copy of source code for reading object code files and graph layout algorithm (The server portion is written in Transaction Application Language. The client portion is written in C++.)

Appendix B—Microfiche copy of source code for a Computer Software Model of the Debugging System written in the Smalltalk computer language.

What is claimed is:

1. A method for analyzing a program having a plurality of functions, the method comprising the steps, performed by a computer system having a graphical output display device, of:

analyzing symbolic information associated with the program to construct a call tree graph of the functions included in the program;

interrupting execution of the program at a predetermined point;

retrieving state information associated with the program; and displaying at least a portion of the call tree graph on the graphical output display device.

2. A method as recited in claim 1 wherein the step of displaying at least a portion of the call tree graph on the graphical output display device operates to display the entire call tree graph.

3. A method as recited in claim 1 wherein the call tree graph is a cyclic call tree graph.

4. A method as recited in claim 1 wherein the call tree graph is an acyclic call tree graph.

5. A method as recited in claim 1 further comprising the step of highlighting the nodes on the call tree graph that have already been executed and their associated internodal lines.

6. A method as recited in claim 1 further comprising the step of receiving a debug command from a user.

7. A method as recited in claim 6 further comprising the step of generating a movable pointer on the graphical output display device and wherein the step of receiving a debug command from a user is performed using the relative positions of the call tree graph and the movable pointer on the graphical output display device.

8. A method as recited in claim 1 further comprising the step of highlighting the portions of the call tree graph on the graphical output display device that correspond to the state of the program.

9. A method as recited in claim 1 wherein the steps of analyzing symbolic information, interrupting execution of the program, and retrieving state information are performed on a server computer and where the step of displaying at least a portion of the call tree graph is performed on a client computer.

10. A method for debugging a program, comprising the steps of:

displaying on a computer screen a call tree graph of at least a portion of the program that is to be debugged;

highlighting those portions of the call tree graph depicting functions of the program that have already been executed; and inputting a debug command by associating a pointer on the graphical representation of the program with the location in the program where the command is to be executed.

11. The method of claim 10, wherein the call tree graph includes function nodes and the debug command expands the call tree graph at the node associated with the pointer.

12. The method of claim 10, wherein the call tree graph includes function nodes and the debug command collapses the graphical representation at the node associated with the pointer.

13. The method of claim 10, further comprising the steps of;

executing the program in accordance with the debug command; and highlighting those portions of the call tree graph executed as a result of the debug command.

14. The method of claim 10, wherein the debug command alters the display on the computer screen without causing the program being debugged to execute additional program steps.

15. A data processing apparatus for analyzing a program having a plurality of functions, the apparatus comprising:

a first processing portion configured to analyze symbolic information associated with the program to construct a call tree graph of the functions included in the program;

a second processing portion configured to interrupt execution of the program at a predetermined point;

a third processing portion configured to retrieve state information associated with the program;

a fourth processing portion configured to display at least a portion of the call tree graph on the graphical output display device; and a fifth processing portion configured to highlight the portions of the call tree graph on the graphical output display device that correspond to the state of the program.

16. An apparatus as recited in claim 15 wherein the fourth processing portion is configurable to display the entire call tree graph.

17. An apparatus as recited in claim 15 wherein the call tree graph is a cyclic call tree graph.

18. An apparatus as recited in claim 15 wherein the call tree graph is an acyclic call tree graph.

19. An apparatus as recited in claim 15 wherein the fifth processing portion highlights the nodes on the call tree graph that have already been executed and their associated internodal lines.

20. A computer program product comprising:

a computer usable medium having computer readable code embodied therein for debugging a program, the computer program product comprising:

first computer readable program code devices configured to cause a computer system to display on a computer screen a call tree graph of at least a portion of the program that is to be debugged;

second computer readable program code devices configured to cause a computer system to highlight those portions of the call tree graph depicting functions of the program that have already been executed; and third computer readable program code devices configured to cause a computer system to input a debug command by associating a pointer on the graphical representation of the program with the location in the program where the command is to be executed.

* * * * *